Aug. 31, 1965  H. HASHEMI TAFRESHI  3,203,192
COOLING A GASEOUS MIXTURE WITH A SOLID
CONTAMINANT IN VAPOR CARRIER
Filed Aug. 15, 1961
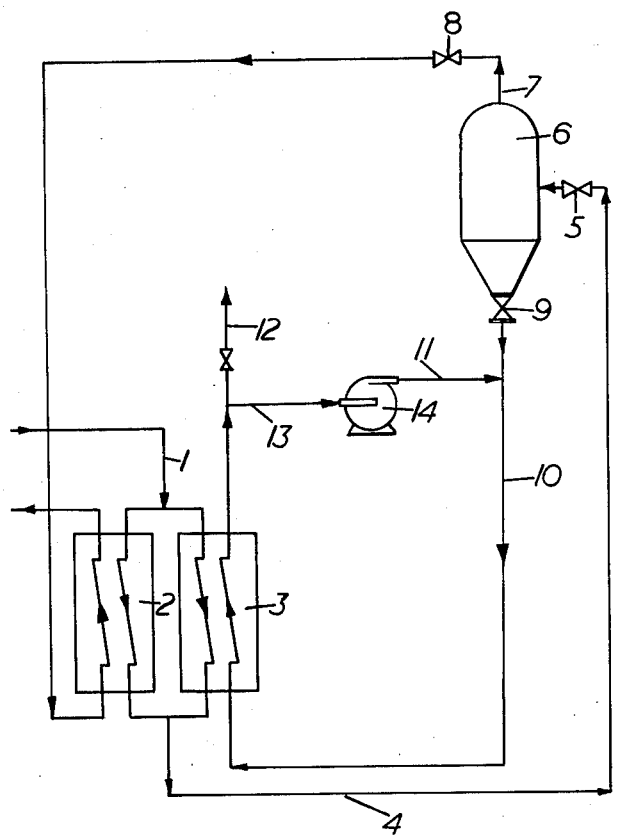
Inventor
Hadi Hashemi-Tafreshi
By
Ooms, McDougall & Hersh
Attorney United States Patent Office 3,203,192
Patented Aug. 31, 1965

3,203,192
COOLING A GASEOUS MIXTURE WITH A SOLID CONTAMINANT IN VAPOR CARRIER
Hadi Hashemi Tafreshi, London, England, assignor to Conch International Methane Limited, Nassau, Bahamas, a company of the Bahamas
Filed Aug. 15, 1961, Ser. No. 131,652
Claims priority, application Great Britain, Nov. 29, 1960, 40,916/60
12 Claims. (Cl. 62—12)

This invention relates to the purification of gases containing contaminants which solidify at higher temperatures than does the gas under treatment and is particularly concerned with the purification of natural gas containing carbon dioxide.

It has already been proposed to remove carbon dioxide from natural gas by precooling natural gas under higher pressure, e.g. 1500 p.s.i.a., and flashing it to a lower pressure, e.g. 250 p.s.i.a., in a separator to form solid carbon dioxide and natural gas containing a greatly reduced carbon dioxide content. Such a process involves problems of handling the solid carbon dioxide and recovering its refrigeration potential, and this invention is directed to solving those problems.

Accordingly, the present invention provides a method of purifying a gas containing contaminants which solidify at higher temperatures than does the gas under treatment which comprises continuously cooling a stream of the gas under superatmospheric pressure, expanding the cold stream of the gas to such conditions of temperature and pressure that the said contaminants precipitate from the gas as a solid, continuously separating the solid contaminant from the purified gas, mixing the separated solid contaminant with vaporised contaminant and heating the mixture to vaporise it completely and using part of this resulting vapour as said vaporised contaminant.

While the invention is primarily of use in removing carbon dioxide from natural gas, it is also possible to use it for removing other contaminants from natural gas or other gases provided the contaminants solidify at temperatures above the solidification temperature of the gas under treatment. For example, it may be used for separating hydrogen sulphide or water from natural gas or carbon dioxide or hydrogen sulphide or water from air, coal gas, producer gas, snythesis gas or hydrogen.

The cold stream of the gas to be treated may be in liquid form or in the form of a cold compressed gas but this is not critical provided that it can be expanded down to such conditions of pressure and temperature that the contaminants separate as a solid. Generally, to achieve this, in the case of natural gas, it will have to be in liquid form before the expansion step.

It will be appreciated that, depending on the particular gas mixture under treatment and the temperature and pressure to which it is expanded, the precipitation of the contaminants in the solid state may be achieved so that the only other phase present is the purified gas in gaseous form. However, more usually a certain amount of the gas in liquid form may exist or be produced in the expansion step. When the latter occurs, the solid contaminant may be separated wholly or partly from the liquid phase prior to its subsequent treatment in accordance with the invention or, where the liquid formation is only in a small proportion, the mixture of liquid and solid may be subjected to such subsequent treatment without further separation.

The solid contaminant separated from the purified gas contains a considerable refrigeration potential. However, it is difficult to use this potential by straight heat exchange because solids do not work efficiently in heat exchangers. They liquefy or vaporise on the heat exchange surfaces, and the liquids or vapours formed do not readily pass heat on to the solid particles remote from said surfaces so that efficiency is low and the heat exchanger may eventually become blocked with solid.

In accordance with the invention, therefore, the solid contaminant separated from the purified gas is mixed with a part of the contaminant which has already been separated and vaporised. Preferably, sufficient vaporised contaminant is added to form with the solid contaminant a saturated vapour. However, it is not necessary that this mixing should lead to complete vaporisation of the solid contaminant immediately provided there is sufficient vapour to make the mixture behave as a gas, i.e. provided a so-called fluidised state is set up.

After the aforesaid mixing step, the mixture is then heated, preferably by heat exchange with the crude gas feed, but in any case to recover the refrigeration potential in the mixture. This heating should result in complete vaporisation of the mixture, and part of this vapour goes to waste and another part is fed back for mixing with the solid contaminants leaving the separator. Circulation of the contaminant in this refrigeration recovery system may be achieved by means of a gas blower or, if the plant is appropriately designed, by natural draught.

The invention will now be described with reference to the accompanying drawing which illustrates a method of removing carbon dioxide from natural gas.

Natural gas containing 30 mol percent of carbon dioxide enters the plant under the pressure of 1000 p.s.i.a and at ambient temperature through conduit 1 and it passes through heat exchangers 2 and 3 in which the natural gas is cooled to $-96°$ F. and so liquefied. After leaving heat exchangers 2 and 3, the liquefied natural gas stream passes through conduit 4 to expansion valve 5 leading to separator 6. On passing through the expansion valve, the pressure on the liquefied natural gas stream is reduced to 500 p.s.i.a., and the temperature drops to $-130°$ F. Under these conditions in separator 6, the solid carbon dioxide is deposited, and the purified gas phase containing 3 mol percent of carbon dioxide is formed. This gas leaves the separator via conduit 7 and control valve 8 and, after passing through heat exchanger 2 to assist in the cooling of the crude natural gas entering the plant, it passes to storage or other desired destination.

The solid carbon dioxide collecting in separator 6 continuously drops through valve 9 into conduit 10 in which it is mixed with a stream of warm gaseous carbon dioxide from conduit 11. This forms in conduit 10 a saturated vaporous stream of carbon dioxide at $-105°$ F. which is passed through heat exchanger 3 to assist in the cooling of the crude natural gas stream to the process. The carbon dioxide vapour stream, after leaving heat exchanger 3 is in part directed through conduit 12 where it goes to waste or other destination and partly through conduit 13 to gas blower 14 which blows the now warm carbon dioxide into conduit 11 to complete the carbon dioxide cycle.

It will be apparent that the above-mentioned example of the operation of this invention provides a method for reducing the carbon dioxide content of natural gas from 30 mol percent to 3 mol percent with the use of the minimum amount of energy. It is possible to reduce the energy requirements further by eliminating the carbon dioxide blower 14 and relying on natural draught to circulate the carbon dioxide around the conduits 10, 13 and 11.

I claim:
1. A method of purifying a gas containing contaminants which solidfy at higher temperatures than does the gas under treatment which comprises continuously cool- ing a stream of the gas under superatmospheric pressure, expanding the cold stream of the gas to such conditions of temperature and pressure that the said contaminants precipitate from the gas as a solid, continuously separating the solid contaminant from the purified gas, mixing the separated solid contaminant with vaporised contaminant in sufficient amount to produce a flowable mixture which behaves as a gas, passing said flowable mixture through a heater to vaporise it completely and using part of this resulting vapour as said vaporised contaminant.

2. A method as claimed in claim 1 wherein the gas is natural gas and the contaminant is carbon dioxide.

3. A method as claimed in claim 1 wherein the cold stream of gas prior to the expansion step is in liquid form.

4. A method of purifying a gas containing contaminants which solidify at higher temperatures than does the gas under treatment which comprises continuously cooling a stream of the gas under superatmospheric pressure, expanding the cold stream of the gas to such conditions of temperature and pressure that the said contaminants precipitate from the gas as a solid, continuously separating the solid contaminant from the purified gas, mixing the separated solid contaminant with vaporised contaminant in sufficient amount to produce a flowable mixture which behaves as a gas, passing said flowable mixture through a heater to vaporise it completely and using part of this resulting vapour as said vaporised contaminant, the cooling of the gas prior to the expansion step being achieved, at least in part, by heat exchange with cold purified gas produced in the process.

5. A method as claimed in claim 4 wherein the gas is natural gas and the contaminant is carbon dioxide.

6. A method as claimed in claim 4 wherein the cold stream of gas prior to the expansion step is in liquid form.

7. A method of purifying a gas containing contaminants which solidify at higher temperatures than does the gas under treatment which comprises continuously cooling a stream of the gas under superatmospheric pressure, expanding the cold stream of the gas to such conditions of temperature and pressure that the said contaminants precipitate from the gas as a solid, continuously separating the solid contaminant from the purified gas, mixing the separated solid contaminant with vaporised contaminant in sufficient amount to produce a flowable mixture which behaves as a gas, passing said flowable mixture through a heater to vaporise it completely and using part of this resulting vapour as said vaporised contaminant, sufficient vaporised contaminant being mixed with the separated solid contaminant to form a saturated vapour.

8. A method as claimed in claim 7 wherein the gas is natural gas and the contaminant is carbon dioxide.

9. A method as claimed in claim 7 wherein the cold stream of gas prior to the expansion step is in liquid form.

10. A method of purifying a gas containing contaminants which solidify at higher temperatures than does the gas under treatment which comprises continuously cooling a stream of the gas under superatmospheric pressure, expanding the cold stream of the gas to such conditions of temperature and pressure that the said contaminants precipitate from the gas as a solid, continuously separating the solid contaminant from the purified gas, mixing the separated solid contaminant with vaporised contaminant and heating the mixture to vaporise it completely and using part of this resulting vapour as said vaporised contaminant, the heating of the mixture of vaporised and solid contaminant being achieved by passing said mixture in heat exchange with the crude feed.

11. A method as claimed in claim 10 wherein the gas is natural gas and the contaminant is carbon dioxide.

12. A method as claimed in claim 10 wherein the cold stream of gas prior to the expansion step is in liquid form.

References Cited by the Examiner

UNITED STATES PATENTS

| | | | |
|---|---|---|---|
| 1,852,388 | 4/32 | Wilcox | 62—46 X |
| 2,296,349 | 9/42 | Hunt | 62—46 |
| 2,522,026 | 9/50 | Evans | 62—52 X |
| 2,528,028 | 10/50 | Barry | 62—12 X |
| 2,608,838 | 9/52 | Rupp | 62—10 |
| 2,738,658 | 3/56 | Bronson | 62—12 |
| 2,900,797 | 8/59 | Kurata | 62—12 X |
| 2,901,326 | 8/59 | Kurata | 62—12 X |
| 2,951,351 | 9/60 | Snelling. | |
| 2,975,606 | 3/61 | Karwat. | |

FOREIGN PATENTS

| | | |
|---|---|---|
| 564,428 | 11/32 | Germany. |
| 1,044,127 | 11/58 | Germany. |
| 147,557 | 11/31 | Switzerland. |

NORMAN YUDKOFF, *Primary Examiner.*

ROBERT A. O. LEARY, *Examiner.*